INVENTORS
HANS H. BALBIERER
FRANK R. HYNES
BY
ATTORNEYS

United States Patent Office 3,561,858
Patented Feb. 9, 1971

---

3,561,858
AUTOMATIC MICROFILM FEEDER, SCANNER AND PROJECTOR
Hans H. Balbierer, Fairport, and Frank R. Hynes, Rochester, N.Y., assignors to Xerox Corporation, Rochester, N.Y., a corporation of New York
Filed May 20, 1968, Ser. No. 730,459
Int. Cl. G03b *23/02*
U.S. Cl. 353—25       8 Claims

ABSTRACT OF THE DISCLOSURE

A projector for automatically feeding microfilm aperture cards including a card transport for feeding card seriatim to a card carriage, where each card is registered, scanned and ejected automatically from the carriage.

---

This invention relates to apparatus for automatically feeding microfilm mounted in data processing cards and to apparatus for optically scanning said cards.

Specifically, this invention relates to an automatic card transport device wherein a stack of cards having microfilm mounted in the aperture thereof is fed to an improved microfilm projection apparatus that scans the microfilm and projects a light image of the microfilm onto a revolving xerographic drum. The data processing cards, herein referred to as aperture cards, contain one or more reproducible images on a strip of microfilm. The scanning mechanism must be capable of selectively positioning the aperture card so that the proper image, or images may be projected onto a xerographic drum. An automatic xerographic reproducing machine of the type suitable for use with the present invention is disclosed in the copending application Ser. No. 730,465 of Edward H. Burnham et al., filed concurrently herewith on May 20, 1968 commonly assigned.

It is therefore an object of this invention to improve optical scanning and projection apparatus for use with aperture cards.

It is a further object of this invention to improve automatic card feeder and ejector mechanisms for use with optical scanning and projector apparatus.

It is a further object of this invention to improve scanning and projection apparatus so that a card carriage containing a data processing card with microfilm images therein may be automatically fed and positioned within the projection apparatus to selectively scan a predetermined image without requiring a visual alignment of the image by the operator.

These and other objects of this invention are attained by means of a movable carriage mounted in a projector and being automatically adjustable. An automatic card transport for feeding card seriatim to the card carriage where each card is registered, scanned and ejected automatically.

For a better understanding of the invention as well as other objects and further features thereof, reference is had to the following detailed description of the invention to be read in connection with the accompanying drawings, wherein.

Figure 1:
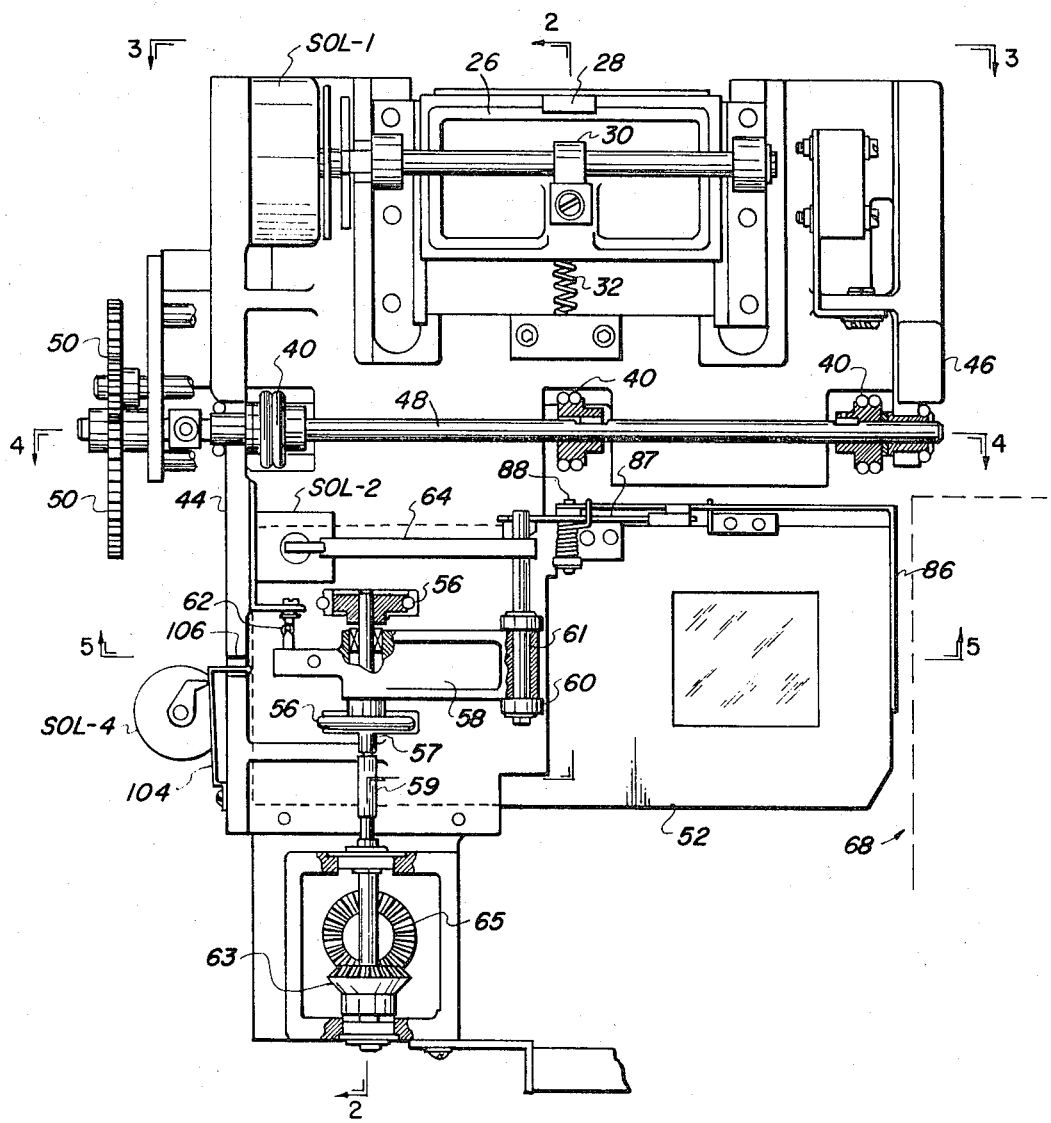
FIG. 1 is a front view of the card feeder and ejector embodying the instant invention.

The exposure is adapted to scan the object to be reproduced and to project an enlarged flowing image of the object onto a rotating xerographic drum in synchronization with the rotation of the xerographic drum as described in the above copending application.

In the system disclosed herein, microfilm data cards 52 are placed adjacent in the card magazine 8 from which they are fed seriatim to a card carriage assembly in a card handling apparatus, generally designated by reference character 11, arranged below the card magazine 8. Suitable driving means are provided for the card carriage whereby it is caused to move the card past the optical axis of a light projecting system to be described hereinafter for the purpose of scanning the microfilm across a scanning light line. The illuminated microfilm is projected by means of an objective lens assembly 12 and onto a xerographic drum (not shown).

A lamp assembly 13 includes a projector lamp LMP–1 positioned in a conventional lamp socket and bracket assembly 14. Both the lamp and the lamp socket assembly are partially enclosed by a lamp housing 15, having secured thereto a conventional reflector 16 and a heat filter 17.

The card feeding apparatus comprises the several devices that serve to feed data cards seriatim from card magazine 8 (see FIG. 2) to a card carriage whereby they are moved past an optical system that is effective to project the data image onto a xerographic drum one or more times, in accordance with the number of copies required. After projection of the required number of light images, the card is ejected from the card carriage and is deposited in the receiving magazine.

For convenience of assembly the card feeding apparatus, as shown in FIGS. 1–6 is mounted on a rigid frame. Microfilm data cards are placed in card magazine assembly 8 that includes vertical guide members 20 for holding a stack of cards in alignment. The magazine is arranged to permit the feeding of cards from the front of the card stack. A backing plate 22 urged by a pair of negator springs 24 urges the cards against the feed block 26.

For moving each card out of the magazine, the apparatus includes a movable feed block 26 and is provided with an adjustable pickerknife 28 that is arranged to engage leading edge of the first card of the stack. Feed block 26 is mounted in suitable ways for sliding movement toward and away from the exit slot of the magazine, and is actuated by arm 30 of rotary solenoid SOL–1 in timed relation to the operation of the remainder of the card handling apparatus. The feed block 26 is returned by a spring 32 (FIG. 1) mounted at the base thereof.

Figure 2:
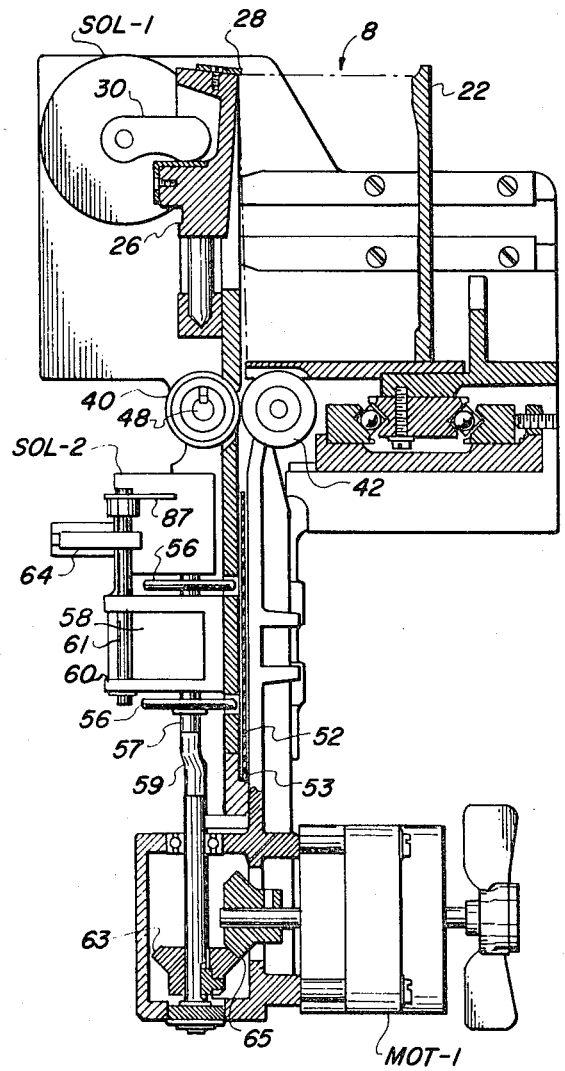
FIG. 2 is a sectional view of the projector taken along line 2—2 of FIG. 1.
Figure 3:
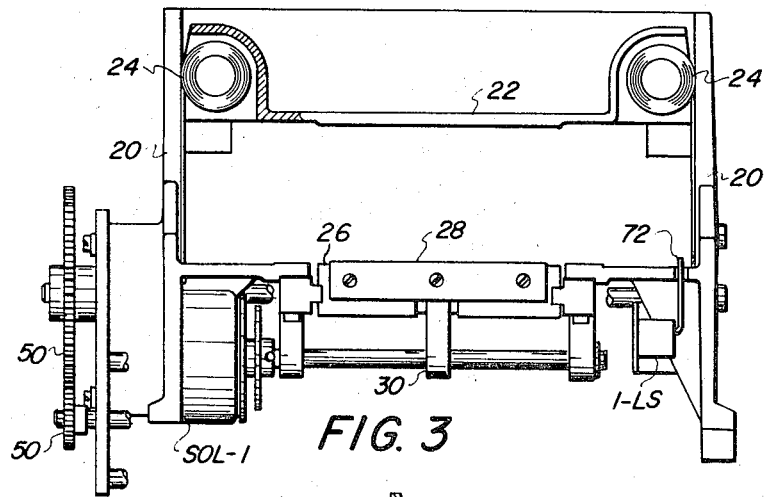
FIG. 3 is a top view of the card feeder along line 3—3 of FIG. 1.
Figure 4:
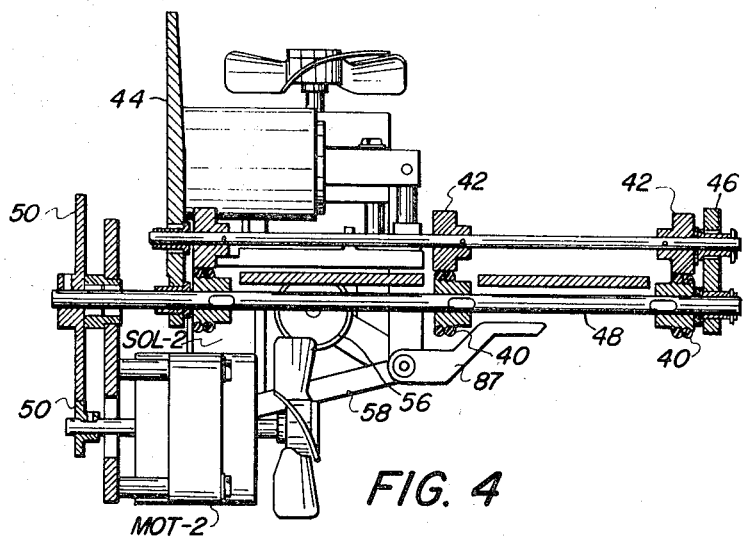
FIG. 4 is a sectional view of the card feeder taken along line 4—4 of FIG. 1.

As each card leaves magazine 8, it is gripped by a set of feed rolls 40 and 42 and advanced downwardly to a card holder of a reciprocable carriage assembly, generally designated by reference character 11. For this purpose, both set feed rolls 40 and 42 are journaled for rotation in side plates 44 and 46. The resilient rolls 40 are driven clockwise as shown in FIG. 2 and are urged into engagement with the inner rolls 42. For driving the feed rolls 40, the shaft 48 thereof extends through bracket 44 and is connected to the suitable driving gears 50 that rotate continuously while the apparatus is in operation. The gears 50 and therefore the rolls 40 are driven by motor MOT–2. The card 52 as shown in FIG. 2 is then advanced to the card carriage 11, which at this point of operation is directly aligned with the feed rolls to receive the card 52. As the card is conveyed from the feed rolls 40 and 42 it is registered against the stop 53 as shown in FIG. 2.

Immediately thereafter, the card carriage 11 is moved to the right, in a path of movement normal to the card feeding movement, to effect the image scanning operation. After the microfilm data is scanned, the carriage is returned to a position in alignment with the feed rolls and the card is ejected from the carriage, as described below. Thereupon, it is engaged by the eject feed rolls 56 that are rotatably mounted on shaft 57 supported in a pivot arm 58, pivoted in the plate 60 by a shaft 61 and is resiliently urged out of contact with card by a spring 62. The shaft 57 is continuously rotated by a flexible drive shaft 59 through suitable gears 63 and 65 powered by a motor MOT-1. A solenoid SOL-2 actuates an arm 64 which is rigidly secured to shaft 61 and thereby actuates the eject rolls 56. The continued driving action of eject rolls 56 is thereby effective to eject the card to the right as shown in FIG. 1 when SOL-2 is actuated. The card is moved to the right and comes to rest in receiving magazine 68 (FIG. 1).

When the supply of cards in card magazine 8 becomes exhausted, means are provided to stop the machine. For this purpose, a "last card" limit switch 1–LS (FIG. 3) is mounted on a side plate. This switch functions in conjunction with the remainder of the electrical circuit to keep the several operating circuits energized as long as switch 1–LS is actuated during the period in which cards remain for feeding to the carriage 11. For this purpose, a switch-actuating element 72 extends through an opening formed in the plate 76. Engagement of each card with actuating element 72 serves to maintain the desired circuitry energized. When the last card is fed the switch 1–LS is deenergized and the circuit is thereby broken to allow the machine to come to the standby mode and after a specified length of time shut down.

The card carriage assembly receives each microfilm data card from the feed rolls and carries it through the scanning cycle, i.e., the "scan" or exposure stroke and the return stroke, during continuous operation of the remaining portions of the machine. In the normal stopping position of the system, the carriage assembly 11 is positioned at the start of its scan stroke of movement, in which it is in register with the card magazine assembly 8. When the system is started, carriage 11 is in a position in register with feed rolls 40 and 42 of the card magazine assembly to receive the next card for reproduction. The carriage is held in this position to permit the ejection of a card carried thereby, if any, and to receive a new card and to effect the several mechanical movements and electrical circuit connections of the card handling operation in proper sequence.

Specifically, card carriage assembly 11 includes the vertically disposed card carriage that is formed of a casting having a flat platen 74 for supporting cards and a vertically disposed gate or pressure pad 102 to which the carriage is secured along its bottom edge. The carriage is adapted for lateral movement, relative to the card magazine assembly, on a shaft 84 which extends within the bushings 85.

The lower portion 90 of the carriage assembly 11 is guided by a pair of stabilized bearings 92 and 94 secured to the base. By this structure, carriage assembly 11 is supported for movement on the shaft 84 while maintaining its card supporting surface in a vertical position throughout its path of movement.

For guiding microfilm data cards onto the carriage platen 74 an L-shaped register arm 86 is pivotally mounted on a pin 88 and actuated by solenoid SOL-2. When solenoid SOL-2 is energized to actuate eject rolls 56 the register arm 86 is also actuated and displaced from the path of movement of the ejected card. After the card is ejected the solenoid SOL-2 is deenergized and the arm 58 is removed from the actuated position by the spring 62 and the register arm 86 is returned to its normal position by the spring 96.

In order to project a light image from a microfilm data card supported on the carriage, a rectangular aperture 103 is formed through the platen 74. The aperture is of a dimension slightly in excess of that of the microfilm data area in a card, and is positioned to adjacent the data area when the card is positioned on the carriage.

For clamping the microfilm data card in scanning position, there is provided solenoid actuated gate or pressure pad 102 (see FIGS. 5 and 6) whereby, when the pad is positioned on a card held on the carriage, the pad securely presses the microfilm data area against the platen 74 so that the minified data area is securely pressed in a vertical plane during the scanning operation.

In order to actuate the pressure pad 102 to permit the insertion and removal of microfilm data cards, the pad is pivotally mounted by a pin 97 to the platen 74.

Figure 5:
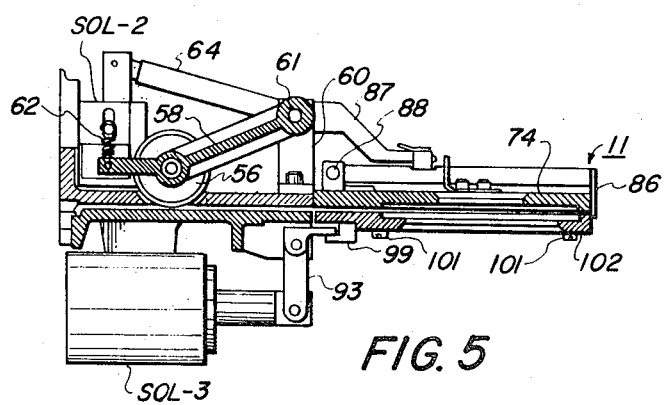
FIG. 5 is a sectional view of the card feeder taken along line 5—5 of FIG. 4.
Figure 6:
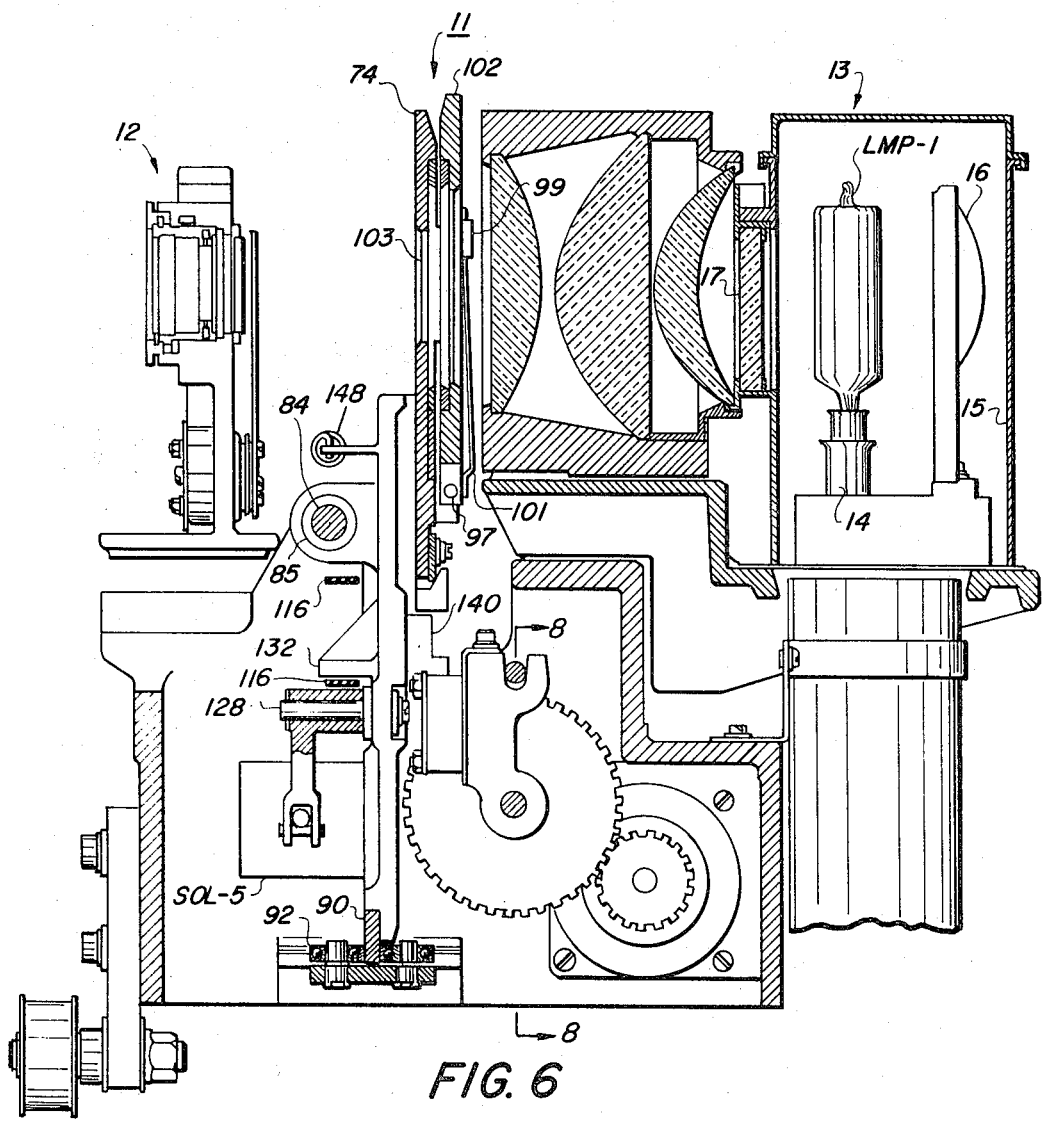
FIG. 6 is a right-hand side view of the projector partly in section and with parts removed for clarity.

Prior to the actuation of solenoid SOL-1 which actuates the pickerknife 28, solenoid SOL-3 is energized thereby opening the projector gate 102 away from platen 74 (see FIG. 5). The solenoid SOL-3 actuates an arm 93 pivotally secured to the frame which contacts a cam 99 secured to the gate 102. When the solenoid SOL-3 is actuated the gate is pivoted open about the pin 97 by the cam 99.

For properly positioning a card on carriage 11 after it is fed thereto, the apparatus includes a register arm 86 (see FIG. 1), together with an actuating linkage. The arm 86 is formed with an offset lever portion 87 that is pivotally mounted on the shaft 88 secured in housing 89 on the backside of the carriage.

The gate or pressure pad 102 is opened, by the action of SOL-3, so that the card has impeded passageway onto the card carriage. SOL-2 is actuated moving the register arm 86 out of the path of the card and moving the eject rolls 56 into contact with the card and thereby ejecting the same. SOL-2 is then deenergized inactivating the eject rolls 56 and replacing the register arm 86 in the path of the card. SOL-1 is then actuated feeding the next card. This card is fed into the feed rolls 40 and 42 and into the carriage 11 against the stop 53. Solenoid SOL-4 then actuates arm 104 pivotally mounted on the housing side plate 44 through opening 106 therein which gives the card a movement to the right and registers the card against the register arm 86. The plate is restored to the position shown in FIGS. 5 and 6 when solenoid SOL-3 is deenergized, and a pair of lead springs 101 that urged the card against the platen.

For driving card carriage assembly 11 during the scanning operation, there is provided a driving arrangement for moving the platen 74 and gate 102 at a predetermined, relatively slow speed during the "scan stroke," and at a relatively higher speed during the return stroke of the carriage. For this puropse, there is provided a constant speed, belt connection 110 (FIG. 7) linked to the main drive (not shown), to effect a predetermined drive rate.

Figure 7:
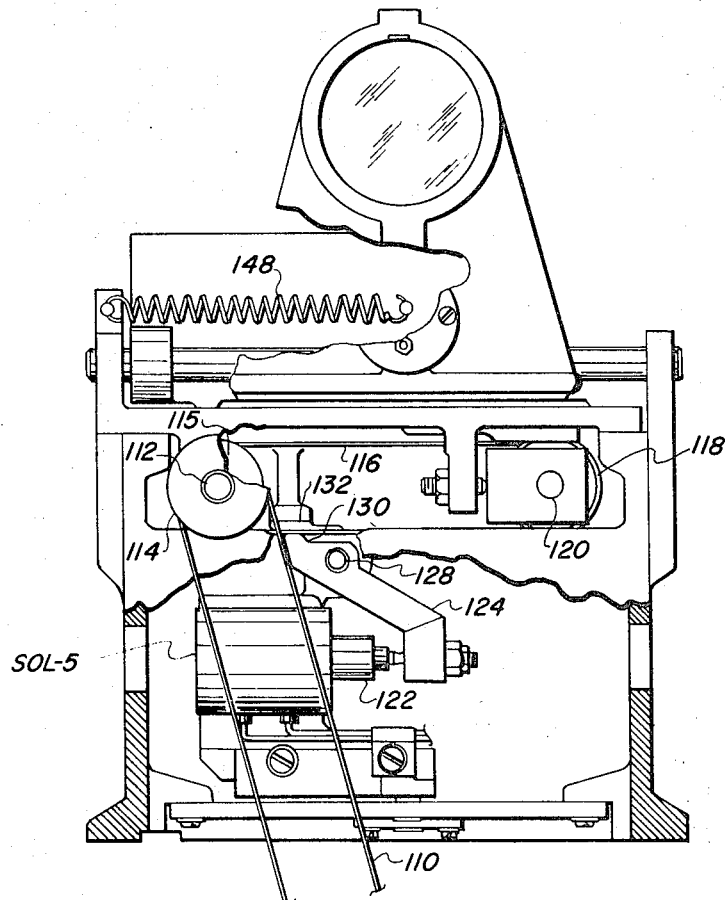
FIG. 7 is a front view of the projector partly in section with parts removed for clarity.

In operation, belt 110 continuously rotates a pulley 114 secured to the shaft 112 which is rotatably mounted in the housing of the projector. The shaft 112 has a second pulley 115 secured thereto and is effective to drive the carriage assembly 11 only during the scanning stroke of the carriage, as described below. A belt 116 is mounted for movement between pulley 115 and a second pulley 118 rotatably mounted on a shaft 120 also rotatably secured to the projector housing. Thus, the belt drive 116 is continuously moving. To effect engagement of drive belt 116 there is provided a solenoid SOL-5 that is mounted in the frame of the machine and has its armature 122 connected to one end of a lever 124 that is pivotally mounted near its other end on a pin 128 secured in the machine frame. At the extreme end 130 of lever 124 adjacent pivot pin 128 there is provided an actuator stop 132 rigidly secured to the carriage 11. When the carriage is to be actuated, the solenoid SOL-5 is energized, to rotate lever 124 clockwise and drive end 130 clockwise to cause the lever 124 to pinch the belt between the end 130 thereof and the stop 132 secured to the carriage 11. This action of the lever 124 causes the carriage 11 along with the solenoid SOL-5 and all its related mechanism to be driven along with the belt 116 from left to right as shown in FIG. 7. The carriage assembly is driven past the axis of the optical system at a rate directly proportional to the rotational speed of a xerographic photoreceptor in order to achieve exact synchronism between the moving card and the sensitized surface of the xerographic photoreceptor. An actuator block 140 is securely mounted on the carriage assembly 11 between a stop 142 and a switch SL-1 mounted on stop 143. As the entire carriage assembly 11 is moving during the scanning stroke the block 140 is moved therewith from the stop 142 to the switch SL-1. When the block 140 reaches the switch SL-1 an actuator 144 is contacted thereby actuating the switch. The switch through a proper circuitry de-energizes SOL-5 releasing lever 124 thereby returning the carriage assembly by a spring 148 secured to the frame at one end and to the carriage at the other. The carriage assembly 11 is returned until actuator block 140 contacts the left stop 142.

Figure 8:
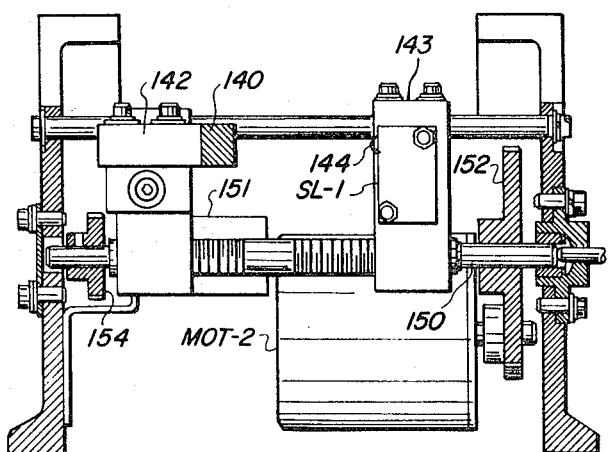
FIG. 8 is a sectional view of the projector taken along line 8—8 of FIG. 6.

The length of scan can be varied by adjusting the relative position of the stops 142 and 143. A voltage is set in the control panel according to the size paper and microfilm being used. If the length of scan is to be changed this is determined by the control panel. A signal is sent to a micro-positioner which in turn sends a signal to the motor MOT-2. The motor drives the shaft 150 through the gear train 152 shaft 150 has right and left-hand threaded portion which will either move the block 140 and 142 which are threaded on the shaft 150 toward or away from each other increasing or decreasing the distance between them thereby setting the length of scan. The gear 158 drives a linear potentiometer 151 (see FIG. 8). The linear potentiometer will match the voltage setup in the micro-positioner and stop the motor when they are equal.

While the invention has been described with reference to the structure disclosed herein, it is not confined to the details set forth; and this application is intended to cover such modifications or changes as may come within the purposes of the improvements or the scope of the following claims.

What is claimed is:

1. In a microfilm projection apparatus of the type wherein a data processing card containing at least one microfilm image frame mounted in an aperture in the data processing card is to be scanned, improved apparatus to feed, and then to move the image frame across the light path of the projection apparatus for scanning and then to eject the card including:
   a card transport system having:
      card carriage means movably mounted to move transversely to the light path of the projection apparatus between a start of scan position and an end of scan position for supporting and transporting individual cards,
      entrance guide means on said carriage means operative to permit the entry of a card at a predetermined time,
      a card feed mechanism to automatically convey each card with a microfilm image frame mounted in the aperture thereof to be scanned into said card carriage means,
      drive means for moving said carriage means reciprocally in a path extending between said start of scan and end of scan positions, and means to eject said card from said carriage means at a predetermined time.

2. A device as recited in claim 1 wherein the path between the start of scan position and the end of scan position can be automatically set.

3. Apparatus as recited in claim 1 wherein a pair of stop members operate to constrain the path of movement of the carriage means, at least one of said stop members being displaceable.

4. Apparatus as recited in claim 1 wherein the means to eject said card includes at least one eject roll actuable to eject said card from said card carriage means in response to a signal.

5. A device as recited in claim 1 including means to automatically register said card in said carriage.

6. Apparatus as recited in claim 1 wherein said entrance guide means includes an actuating arm to position said card.

7. Apparatus as recited in claim 1 wherein said carriage means includes a platen having an opening formed therein and an actuatable gate having an opening formed therein, said gate being movable into and out of contact with said platen for clamping said card thereto with the image frame aligned with said openings.

8. Apparatus according to claim 1 wherein said drive means includes a control means for moving said carriage means at a relatively slow speed scan stroke and at a relatively high speed return stroke.

References Cited

UNITED STATES PATENTS

| | | | |
|---|---|---|---|
| 3,153,870 | 10/1964 | Carlton | 353—25X |
| 3,205,769 | 9/1965 | Roth et al. | 353—27 |

FOREIGN PATENTS

| | | | |
|---|---|---|---|
| 697,228 | 11/1964 | Canada | 353—25 |

WILLIAM D. MARTIN, JR., Primary Examiner